Figure 1:
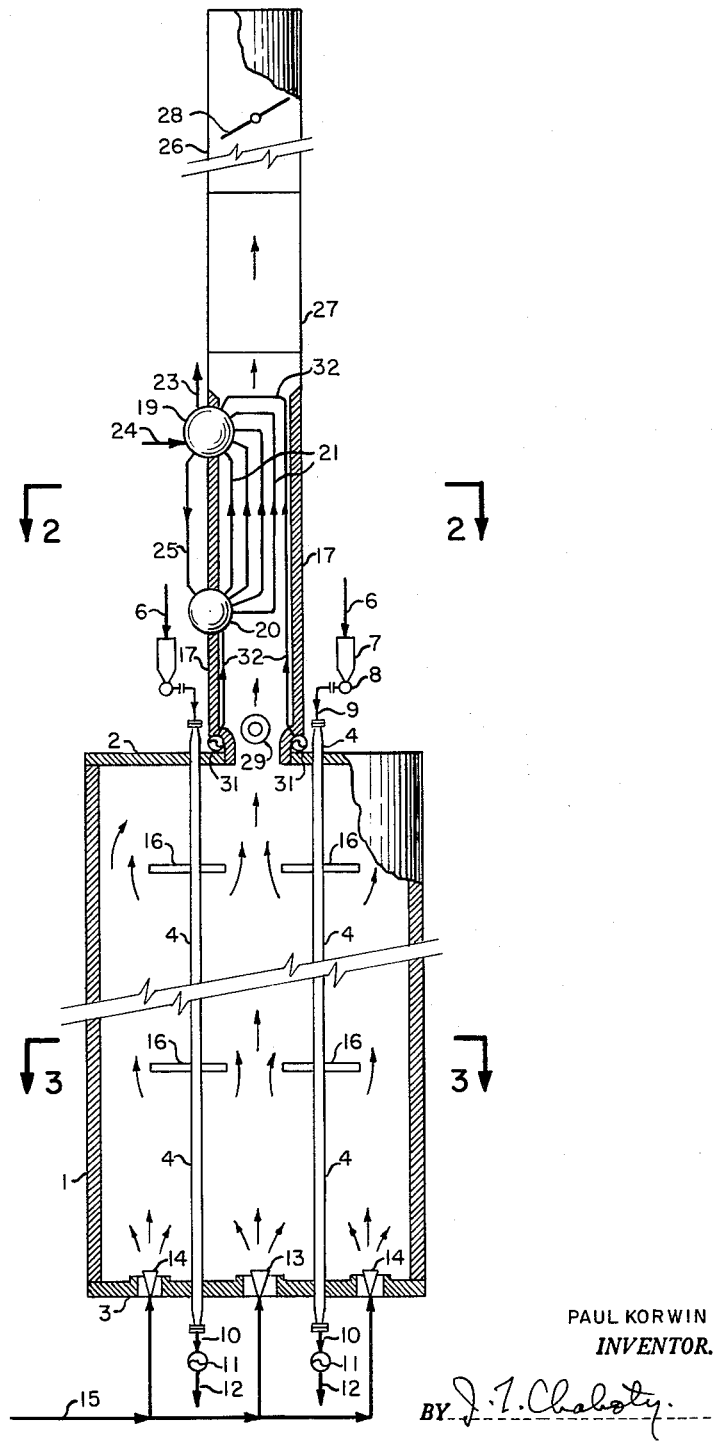

FIG. I

PAUL KORWIN
*INVENTOR.*

BY J. T. Chaboty
AGENT

United States Patent Office 3,215,502
Patented Nov. 2, 1965

3,215,502
REFORMER FURNACE
Paul Korwin, Flushing, N.Y., assignor to Chemical Construction Corporation, New York, N.Y., a corporation of Delaware
Filed July 30, 1962, Ser. No. 213,296
11 Claims. (Cl. 23—277)

The present invention relates to apparatus for the catalytic reforming of fluid hydrocarbons. An improved furnace arrangement has been devised, which permits the accommodation of linear banks of catalyst tubes in a circular furnace shell. In addition, this new furnace arrangement has been combined with a flue gas waste heat boiler in a novel manner.

The primary reforming of fluid hydrocarbons is a well-known process for the preparation of hydrogen-carbon monoxide synthesis gas. In this procedure, a gaseous hydrocarbon such as methane or a gasified liquid hydrocarbon such as propane is mixed with steam. The process mixture is passed through catalyst-filled tubes mounted in a furnace and externally heated by combustion burners. Reaction takes place between the fluid hydrocarbon and the steam, yielding a process gas mixture principally consisting of hydrogen and carbon monoxide, together with some carbon dioxide and excess steam. This gas mixture is further processed by conventional procedures to yield a final hydrogen, hydrogen-nitrogen or hydrogen-carbon monoxide gas mixture.

In the present invention, an improved arrangement of furnace apparatus has been developed, in which two parallel linear banks or rows of catalyst-filled reformer tubes are mounted in a circular furnace instead of a rectangular furnace. This has not been attempted up to now, because of the danger of overheating the end tubes nearest the furnace wall and other adverse temperature gradient considerations. In the present invention, horizontal gas baffles are provided between the end tubes and the wall, thus achieving substantially uniform heating and permitting the accommodation of linear tube banks in a circular furnace. In addition, a novel arrangement of rectangular flue gas wasteheat boiler and auxiliary secondary burner have been combined with the furnace structure of the present invention.

The advantages of providing a circular furnace enclosure combined with linear rows of reformer tubes are numerous. Since the furnace shell is cylindrical, the lining is circular. Thus, the lining has a better capability to absorb expansion due to thermal action, with far less tendency to crack on heating. The circular arrangement avoids the use of a suspended wall lining such as is used in rectangular furnaces. Thus, the furnace shape becomes more economical to construct, compared to rectangular furnaces, particularly for smaller size furnaces. Process gas headers are straight and easy to manufacture, with thermal expansions in piping and catalyst tubes readily compensated for by flexibility of connections and equivalent piping runs.

Providing an integrated rectangular flue gas waste heat boiler, mounted above a rectangular opening in the roof of the reformer furnace, also results in several important advantages. The lower part of the boiler chamber is preferably used to form a combustion chamber for an auxiliary burner. Thus, the dimensions of the furnace itself are kept at a minimum. Since the hot gases are used essentially at their source in the waste heat boiler, the volume of flowing flue gases is very rapidly reduced by cooling. As a result, the size of process ducts is reduced. Due to the straight-through flow of flue gases, draft losses are relatively small and natural draft may be employed.

The main advantages may be summarized as compactness of furnace layout, high thermal efficiency, and the practicality of using natural draft in the furnace and auxiliary units. The system is adaptable to low pressure and high pressure reforming, as well as to straight-through or return types of reformer tubes.

It is an object of the present apparatus to provide an improved furnace for the catalytic reforming of fluid hydrocarbons.

Another object is to provide a furnace having a circular shell together with linear tube banks, and having substantially uniform tube temperatures.

An additional object is to provide a more compact furnace of lower initial capital cost.

A further object is to provide a furnace having linear tube banks in which the refractory lining has a reduced tendency to crack.

Still another object is to provide an improved combination of reformer furnace with waste heat boiler, having high thermal efficiency.

Figure 2:
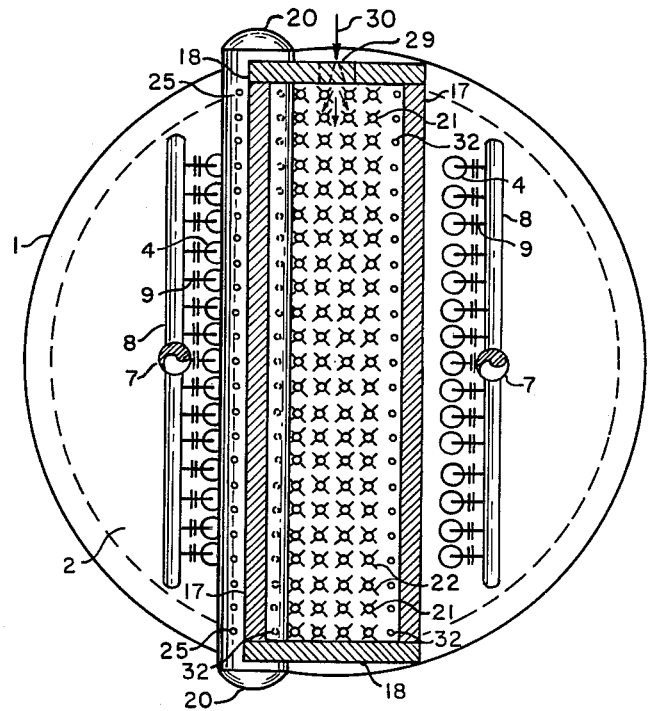
Figure 3:
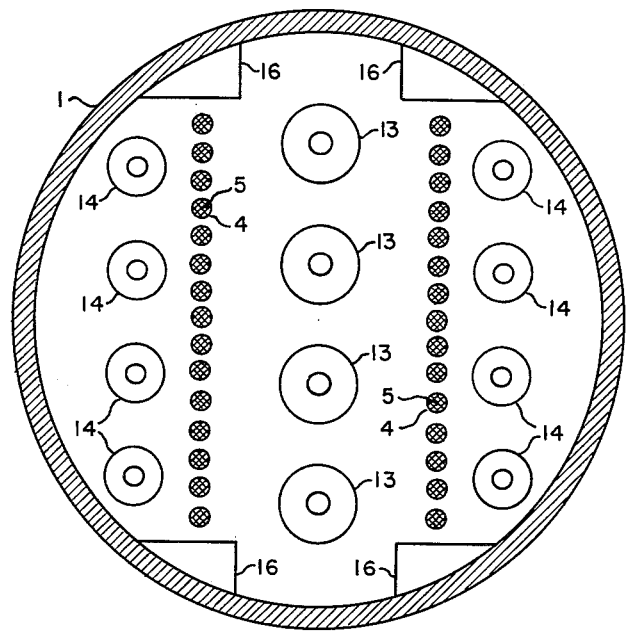

These and other objects and advantages of the present invention will become evident from the description which follows. Referring to the figures FIGURE 1 is an overall elevation view of the furnace. FIGURES 2 and 3 are sectional plan views of the waste heat boiler and and furnace respectively, taken on sections 2—2 and 3—3.

In FIGURE 1, the refractory-lined furnace shell 1 is of vertical cylindrical shape, and is provided with refractory-lined roof 2 and floor 3. Two rows of catalyst-filled reformer tubes 4 are mounted in the furnace. The arrangement of these tubes in two parallel linear rows is shown in FIGURE 3. The tubes are of the once-through type, and are charged with catalyst 5. The input mixed stream of fluid hydrocarbon and steam is passed via 6 into main conduits 7, and thereafter passes downward into feed manifolds. 8. The process stream now passes via individual feed pipes 9 into the upper ends of tubes 4. The process stream passes downward inside tubes 4, and is heated and catalytically reformed. The resulting crude synthesis gas is withdrawn from the bottom of tubes 4 via pipes 10, and collected in manifolds 11. The combined crude synthesis gas is now passed to further processing via 12.

The two rows of reformer tubes 4 are heated in furnace 1 by three rows of burners mounted in the floor 3. The central row of burners 13 is preferably somewhat larger than the outer rows 14. The rows are arranged symmetrically with respect to rows 4 of reformer tubes. Thus, burners 13 are centrally positioned on a geometric diameter of the circular furnace. A fluid hydrocarbon such as fuel oil is passed via 15 to the burners, dividing into individual feed streams for each burner. Combustion air is drawn through the floor 3 and into the furnace via openings in the burner structures. The combustion flames and rising hot flue gases serve to maintain the proper temperature inside tubes 4 for catalytic reforming.

As the hot flue gases rise in the furnace, the hot gas stream is deflected by baffles 16, so as to reduce the circulation of flue gas between the wall 1 and the end reformer tubes in each row. This provision of gas baffles forms an important aspect of the present invention, since it has been found that provision of these baffles reduces the heat input into the end tubes to the same level as that of the rest of the tubes. The baffles also have a minor corrective effect on the heat input to tubes immediately adjacent to the end tubes. This results in better heat distribution, more uniform temperature levels, and also prevents possible bending or warping of the end tubes due to local overheating.

The rising hot flue gases now leave the furnace section via a central rectangular opening in the roof 2, and pass into a thermal section for heat recovery defined by rectangular refractory walls 17 and 18. Walls 17 are identical except that a steam drum 19 is disposed at the top of one wall, with a mud drum 20 mounted below drum 19. A plurality of water tubes 21 extend between steam drum 19 and mud drum 20, in the upper part of the rectangular thermal section. Tubes 21 are preferably arranged in parallel rows as shown in FIGURE 2, with the central rows being provided with fins 22 for improved heat transfer. As the rising hot flue gases pass tubes 21, the tubes are heated and steam is generated. This steam is withdrawn from steam drum 19 via 23. As most clearly shown in FIGURE 2, two rows of water tubes without fins are preferably disposed immediately adjacent to walls 17, in order to protect the walls by lowering the temperature of flue gases adjacent to the walls. Boiler feed water is passed via 24 into steam drum 19, and passes via downcomer tubes 25 disposed external to wall 17 into mud drum 20.

The rising flue gas now passes up from the rectangular thermal section to circular stack 26 via converging transition section 27. Stack 26 is provided with control damper 28, and discharges the cooled flue gas to atmosphere.

An auxiliary burner unit may be provided in the lower part of the thermal section, so as to provide secondary combustion for greater steam generation. Thus, burner 29 is mounted in the lower part of wall 18 below mud drum 20. A fluid hydrocarbon fuel is passed via 30 to burner 29, with secondary combustion air being drawn in around the burner 29 by means of natural draft from stack 26. Burner 29 serves to raise the overall temperature of the rising flue gas, thus allowing greater output of steam via 23. A secondary boiler feed water manifold or header 31 is provided at the base of walls 17, together with water tubes 32 which are disposed immediately adjacent to walls 17 for protection of the walls against thermal deterioration.

Various alternatives may be practiced within the scope of the present invention. The horizontal baffles 16 may be of any suitable shape which serves to deflect the rising flue gas, however, the semi-triangular shape shown in FIGURE 3 is preferable. The auxiliary burner-secondary combustion unit may be omitted, and other waste heat boiler configurations may be provided. The waste heat boiler arrangement shown and described supra is an important part of the present invention, and forms a preferred embodiment. However, other heat exchange means may be adopted, and in regions of very low fuel cost the recovery of sensible heat from the flue gas may be omitted. Other types of catalyst-filled reform tubes may be utilized in the apparatus of the present invention, such as the two-pass tube with central void duct shown in U.S. Patent 2,660,519. Auxiliary horizontal burner elements such as unit 29 of FIGURE 1 may be provided in the wall 1 of the furnace, in order to provide more uniform temperature control. Other alternatives besides those mentioned will occur to those skilled in the art.

Example

An example of an engineered industrial application of the apparatus of the present invention, and resultant cost savings, will now be described. The basic conditions for comparison purposes assumed that two furnaces were to be constructed, one having the parallel tube banks layout of the present invention and the other having the "cross-layout" of tubes as shown in U.S. Patent 2,660,519. Each furnace contained 36 catalyst filled tubes of 5¾" O.D., with 28' of exposed heated length. The tubes were assumed to be identical in structure, and were made of centrifugally cast heat resistant alloy. A cylindrical type of furnace enclosure was provided, lined with refractory of 16' 6" inside diameter and having a combustion chamber 28' in height.

Operating conditions were as follows:

| | |
|---|---|
| Process gas pressure | 165 p.s.i.g. |
| Process gas temperature—in | 750° F. |
| Process gas temperature—out | 1150° F. |
| Process gas quantity | 231 mols/hr. (equivalent to synthesis gas required for 100 ton/day ammonia plant). |
| Catalyst tube temperature | 1700° F. |
| Burner fuel (natural gas) | 960 B.t.u./ft.$^3$ L.H.V. |
| Burner fuel quantity | 110 mols/hr. |
| Auxiliary burner fuel quantity | 40 mols/hr. |
| Steam production: | |
| Quantity | 23,300#/hr. |
| Pressure | 225 p.s.i.g. |
| Quality | Saturated |

Under the process conditions and with the apparatus specifications described supra, the cost of a furnace having the parallel tube-banks layout of the present invention was $157,800. A furnace having the "cross-layout" had an established estimated cost of $209,600. Thus, the new apparatus layout of the present invention resulted in a capital cost saving of 23.7%, based on the established estimated cost for a "cross-layout" type of furnace arrangements.

What I claim is:

1. Reformer furnace for catalytic reaction of a fluid hydrocarbon with steam to produce hydrogen and carbon monoxide comprising a vertical cylindrical refractory-lined furnace enclosure having horizontal roof and floor sections, two parallel linear rows of catalyst-filled reformer tubes vertically disposed within said furnace, said rows of tubes being symmetrically positioned on opposite sides of a diameter of said furnace, a central linear row of burners mounted in said floor, said central row of burners being centrally disposed between and parallel to said rows of tubes, two linear rows of outer burners, said rows of outer burners being symmetrically mounted in said floor parallel to said rows of tubes and on opposite sides of said rows of tubes from said central row of burners, whereby uniform flow of hot combustion gas adjacent to said rows of tubes is attained, a plurality of substantially horizontal gas baffles extending inward from the wall of said furnace, at least one of said baffles being positioned adjacent to each end tube of each of said rows of tubes, whereby the flow of combustion gas about said end tubes is restricted and the operating temperature of said end tubes is maintained substantially at the same level as the remainder of said tubes, means to pass a mixture of fluid hydrocarbon and steam through said tubes and in contact with said catalyst, means to recover a reformed gas mixture containing hydrogen and carbon monoxide from said tubes, means to pass a fluid hydrocarbon and combustion air to said burners, and flue gas disposal means extending from said roof.

2. Apparatus of claim 1, in which the number of gas baffles is eight, with two of said baffles being positioned adjacent to each end tube of each of the two rows of tubes and spaced apart opposite to said end tube, whereby combustion gas flow along each of said end tubes is substantially restricted and the operating temperature of each of the tubes in each of said rows is maintained at a substantially identical level.

3. Apparatus of claim 1, in which heat recovery means are disposed above said roof together with means to pass hot flue gas generated by said burners through said heat recovery means, prior to passing said flue gas to said disposal means.

4. Apparatus of claim 3, in which said heat recovery means is a waste heat steam boiler.

5. Reformer furnace for catalytic reaction of a fluid hydrocarbon with steam to produce sydrogen and carbon monoxide, together with improved heat recovery elements, which comprises a vertical cylindrical refractory-lined furnace enclosure having horizontal roof and floor sections, two parallel linear rows of catalyst-filled reformer tubes vertically disposed within said furnace, said rows of tubes being symmetrically positioned on opposite sides of a diameter of said furnace, a central linear row of burners mounted in said floor, said central row of burners being centrally disposed between and parallel to said rows of tubes, two linear rows of outer burners, said rows of outer burners being symmetrically mounted in said floor parallel to said rows of tubes and on opposite sides of said rows of tubes from said central row of burners, whereby uniform flow of hot combustion gas adjacent to said rows of tubes is attained, a plurality of substantially horizontal gas baffles extending inward from the wall of said furnace, at least one of said baffles being positioned adjacent to each end tube of each of said rows of tubes, whereby the flow of combustion gas about said end tubes is restricted and the operating temperature of said end tubes is maintained substantially at the same level as the remainder of said tubes, means to pass a mixture of fluid hydrocarbon and steam through said tubes and in contact with said catalyst, means to recover a reformed gas mixture containing hydrogen and carbon monoxide from said tubes, means to pass a fluid hydrocarbon and combustion air to said burners, a flue gas waste heat boiler disposed above a substantially rectangular opening in the roof of said furnace, said rectangular opening having two parallel sides which are longer than the other two sides, the longer sides of each rectangular opening being parallel with said linear rows of reformer tubes, said waste heat boiler comprising a vertical rectangular refractory-lined enclosure extending upward from said rectangular opening and having two parallel sides which are horizontally longer than the other two sides, the longer sides of said rectangular enclosure being parallel with said linear rows of reformer tubes, a horizontal steam drum disposed at the top and extending above one of the longer sides of said rectangular enclosure, a mud drum mounted below and parallel to said steam drum, a plurality of water tubes extending between said steam drum and said mud drum, said water tubes being vertically oriented in said rectangular enclosure, means to pass boiler feed water to said mud drum, means to remove generated steam from said steam drum, and a flue gas disposal stack extending upward from said waste heat boiler.

6. Apparatus of claim 5, in which the number of gas baffles is eight, with two of said baffles being positioned adjacent to each end tube of each of the two rows of tubes and spaced apart opposite to said end tube, whereby combustion gas flow along each of said end tubes is substantially restricted and the operating temperature of each of the tubes in each of said rows is maintained at a substantially identical level.

7. Apparatus of claim 5, in which said water tubes are provided with external vertical fins, whereby improved heat transfer to internal boiler feed water is obtained.

8. Apparatus of claim 5, in which said water tubes are arranged in a plurality of parallel linear rows, said rows being disposed parallel to the longer sides of said rectangular enclosure.

9. Apparatus of claim 5, in which a plurality of water tubes extending between said water drum and said mud drum are provided external to said rectangular enclosure, said external water tubes acting as downcomers to provide improved circulation of boiler feed water in said steam boiler.

10. Reformer furnace for catalytic reaction of a fluid hydrocarbon with steam to produce hydrogen and carbon monoxide, together with improved heat recovery elements, which comprises a vertical cylindrical refractory-lined furnace enclosure having horizontal roof and floor sections, two parallel linear rows of catalyst-filled reformer tubes vertically disposed within said furnace, said rows of tubes being symmetrically positioned on opposite sides of a diameter of said furnace, a central linear row of burners mounted in said floor, said central row of burners being centrally disposed between and parallel to said rows of tubes, two linear rows of outer burners, said rows of outer burners being symmetrically mounted in said floor parallel to said rows of tubes and on opposite sides of said rows of tubes from said central row of burners, whereby uniform flow of hot combustion gas adjacent to said rows of tubes is attained, a plurality of substantially horizontal gas baffles extending inward from the wall of said furnace, at least one of said baffles being positioned adjacent to each end tube of each of said rows of tubes, whereby the flow of combustion gas about said end tubes is restricted and the operating temperature of said end tubes is maintained substantially at the same level as the remainder of said tubes, means to pass a mixture of fluid hydrocarbon and steam through said tubes and in contact with said catalyst, means to recover a reformed gas mixture containing hydrogen and carbon monoxide from said tubes, means to pass a fluid hydrocarbon and combustion air to said burners, a combined thermal section comprising a secondary combustion unit and a flue gas waste heat boiler disposed above a substantially rectangular opening in the roof of said furnace, said rectangular opening having two parallel sides which are longer than the other two sides, the longer sides of said rectangular opening being parallel with said linear rows of reformer tubes, said thermal section comprising a vertical rectangular refractory-lined enclosure extending upward from said rectangular opening and having two parallel sides which are horizontally longer than the other two sides, the longer sides of said rectangular enclosure being parallel with said linear rows of reformer tubes, a horizontal steam drum disposed at the top and extending above one of the longer sides of said rectangular enclosure, a mud drum mounted on said longer side below and parallel to said steam drum, a plurality of water tubes extending between said steam drum and said mud drum, said water tubes being vertically oriented in said rectangular enclosure, means to pass boiler feed water to said mud drum, means to remove generated steam from said steam drum, a secondary boiler feed water manifold at the base of said rectangular enclosure, means to pass boiler feed water to said secondary manifold, a plurality of secondary water tubes extending upward from said secondary manifold and adjacent the inner surface of said rectangular enclosure, said secondary water tubes extending to said steam drum, an auxiliarly hydrocarbon burner mounted in the wall of said rectangular enclosure below said mud drum, means to pass fluid hydrocarbon and combustion air to said auxiliary burner whereby the main stream of flue gas is further heated, and a flue gas disposal stack extending upward from said waste heat boiler.

11. Reformer furnace for catalytic reaction of a fluid hydrocarbon with steam to produce hydrogen and carbon monoxide, together with improved heat recovery elements, which comprises a vertical cylindrical refractory-lined furnace enclosure having horizontal roof and floor sections, two parallel linear rows of catalyst-filled reformer tubes vertically disposed within said furnace, said rows of tubes being symmetrically positioned on opposite sides of a diameter of said furnace, a central linear row of burners mounted in said floor, said central row of burners being centrally disposed between and parallel to said rows of tubes, two linear rows of outer burners, said rows of outer burners being symmetrically mounted in said floor parallel to said rows of tubes and on opposite sides of said rows of tubes from said central row of burners, whereby uniform flow of hot combustion gas adjacent to said rows of tubes is attained, a plurality of substantially horizontal gas baffles extending inward from the wall of said furnace, at least one of said baffles being positioned adjacent to each end tube of each of said rows of tubes, whereby the flow of combustion gas about said end tubes is restricted and the operating temperature of said end tubes is maintained substantially at the same level as the remainder of said tubes, means to pass a mixture of fluid hydrocarbon and steam through said tubes and in contact with said catalyst, means to recover a reformed gas mixture containing hydrogen and carbon monoxide from said tubes, means to pass a fluid hydrocarbon and combustion air to said burners, a flue gas waste heat boiler disposed above a substantially rectangular opening in the roof of said furnace, said rectangular opening having two parallel sides which are longer than the other two sides, the longer sides of said rectangular opening being parallel with said linear rows of reformer tubes, said waste heat boiler comprising a vertical rectangular refractory-lined enclosure extending upward from said rectangular opening and having two parallel sides which are horizontally longer than the other two sides, the longer sides of said rectangular enclosure being parallel with said linear rows of reformer tubes, a horizontal steam drum disposed at the top and extending above one of the longer sides of said rectangular enclosure, a mud drum mounted below and parallel to said steam drum, a plurality of water tubes extending between said steam drum and said mud drum, said water tubes being vertically oriented in said rectangular enclosure and arranged in a plurality of parallel linear rows, said rows being disposed parallel to the longer side of said rectangular enclosure with one of said rows being disposed immediately adjacent to one side wall of said enclosure, in order to partially protect said side wall from rising hot flue gas, means to pass boiler feed water to said mud drum, means to remove generated steam from said steam drum, and a flue gas disposal stack extending upward from said waste heat boiler.

References Cited by the Examiner

UNITED STATES PATENTS

| 2,381,696 | 8/45 | Schapleigh. | |
|---|---|---|---|
| 2,620,262 | 12/52 | Hujsak et al. | 23—284 X |
| 2,660,519 | 11/53 | McCarthy | 23—288.92 |
| 2,667,449 | 1/54 | Mekler | 122—356 X |
| 2,862,480 | 12/58 | Oberg | 23—277 X |
| 2,878,108 | 3/59 | Chandler | 23—288 |
| 3,129,065 | 4/64 | Koniewieg | 23—277 |

MORRIS O. WOLK, *Primary Examiner.*

MAURICE A. BRINDISI, *Examiner.*